United States Patent
Schlenhoff et al.

(10) Patent No.: US 8,807,970 B2
(45) Date of Patent: Aug. 19, 2014

(54) COOLING SYSTEM FOR A MULTISTAGE ELECTRIC MOTOR

(75) Inventors: Behrend Goswin Schlenhoff, Hamburg (DE); Axel Helmut Tank-Langenau, Remmels (DE); Charles James Powers, Westminster, MD (US); Thomas Albers, Ahrensburg (DE)

(73) Assignee: Flowserve Management Company, Irving, TX (US)

( * ) Notice: Subject to any disclaimer, the term of this patent is extended or adjusted under 35 U.S.C. 154(b) by 899 days.

(21) Appl. No.: 12/713,943

(22) Filed: Feb. 26, 2010

(65) Prior Publication Data

US 2011/0211979 A1    Sep. 1, 2011

(51) Int. Cl.
| | |
|---|---|
| F04B 53/08 | (2006.01) |
| F04B 17/03 | (2006.01) |
| H02K 9/19 | (2006.01) |
| H02K 5/132 | (2006.01) |

(52) U.S. Cl.
USPC ..... 417/423.8; 417/367; 417/368; 417/423.3; 417/555.2; 310/54; 310/58; 310/59

(58) Field of Classification Search
USPC ................ 417/366, 367, 368, 369, 370, 371, 417/423.3, 555.2, 423.8; 310/54, 58, 59, 87
See application file for complete search history.

(56) References Cited

U.S. PATENT DOCUMENTS

| | | | |
|---|---|---|---|
| 3,671,786 A | 6/1972 | Jones | |
| 4,329,122 A * | 5/1982 | Owada et al. | 417/365 |
| 4,808,087 A | 2/1989 | Tsutsui et al. | |
| 4,830,584 A | 5/1989 | Mohn | |
| 5,229,676 A * | 7/1993 | Bood | 310/114 |
| 5,324,179 A | 6/1994 | Nakagawa | |
| 5,415,603 A * | 5/1995 | Tuzuki et al. | 477/5 |
| 5,659,214 A * | 8/1997 | Guardiani et al. | 310/87 |
| 5,713,727 A | 2/1998 | Veronesi et al. | |
| 5,898,245 A | 4/1999 | Cochimin | |
| 5,980,218 A | 11/1999 | Takahashi et al. | |

(Continued)

FOREIGN PATENT DOCUMENTS

| | | |
|---|---|---|
| DE | 102005034341 | 1/2007 |
| FR | 2098196 A1 | 10/1972 |

(Continued)

OTHER PUBLICATIONS

International Search Report and Written Opinion relating to International Application No. PCT/US0211/020810, mailed Dec. 2, 2011.
"German Geothermal Motor Development (GGMD), High Temperature SUBM", Vertical Insight, Second Quarter 2007, pp. 1, 2, flowserve.com.

(Continued)

*Primary Examiner* — Peter J Bertheaud
*Assistant Examiner* — Dominick L Plakkoottam
(74) *Attorney, Agent, or Firm* — Dinsmore & Shohl LLP

(57) ABSTRACT

A multistage electric motor includes a plurality of motor stages connected in series, each motor stage comprising a stator, and a rotor; a plurality of cooling fluid paths, each cooling fluid path forming a recirculating loop independent of the other cooling fluid paths, each cooling fluid path in communication with the stator of one of motor stages; and a cooling fluid flowing through each cooling fluid path, the cooling fluid removing heat from the stator of each motor stage. A submersible pump including the multistage electric motor, and a method of cooling the multistage electric motor are also described.

12 Claims, 6 Drawing Sheets

(56) References Cited

U.S. PATENT DOCUMENTS

| | | |
|---|---|---|
| 6,000,915 A | 12/1999 | Hartman |
| 6,089,837 A * | 7/2000 | Cornell .................. 417/540 |
| 6,304,011 B1 * | 10/2001 | Pullen et al. ................ 310/52 |
| 6,457,950 B1 | 10/2002 | Cooper et al. |
| 7,188,669 B2 * | 3/2007 | Bullock et al. ............... 166/105 |
| 2003/0116323 A1 * | 6/2003 | Pettigrew ................ 166/369 |
| 2003/0156947 A1 | 8/2003 | Gross |
| 2006/0222529 A1 * | 10/2006 | Watson et al. ............. 417/414 |
| 2007/0096588 A1 * | 5/2007 | Kirchner ................. 310/261 |

FOREIGN PATENT DOCUMENTS

| | | |
|---|---|---|
| FR | 2678987 | 1/1993 |
| JP | 8184480 | 7/1996 |
| JP | 2007085309 A | 4/2007 |
| WO | 9013937 A1 | 11/1990 |

OTHER PUBLICATIONS

Chinese Office Action dated Apr. 2, 2014, pertaining to Chinese Patent Application Serial No. 201180016362.4.

* cited by examiner

COOLING SYSTEM FOR A MULTISTAGE ELECTRIC MOTOR

BACKGROUND

Embodiments of the present invention relate generally to cooling systems for submersible pump systems and, more particularly, to submersible pump systems comprising submersible multi-stage motors with independent cooling systems.

Submersible pumps are typically driven by submersible motors. Generally, they are operable in a variety of applications in which both the pump and the motor are completely submerged in a well. A submersible motor for a submersible pump system has a stator that drives rotation of a rotor, generating heat during operation. This generated heat must be removed from the motor to prevent damage to the motor winding and extend the operational life of the motor. Submersible motors may be filled with a motor cooling fluid that transfers the heat from inside of the motor to the well fluid outside of the motor. The motor may include a cooling system that re-circulates and cools the motor cooling fluid so as to maintain a desired, cool temperature of the motor cooling fluid and the motor.

Deep-well submersible (DWS) pumping systems (also referred to as electric submersible pumps (ESP)) are especially useful in extracting valuable resources such as oil, gas, and water from deep well geological formations. In one particular operation, geothermal resources, such as hot water, can be retrieved from significant depths using DWS pumps. In a conventional configuration, a centrifugal pump and the motor that powers the pump are axially aligned and oriented vertically in the well. Because DWS pumping systems are relatively inaccessible (often completely submerged at distances up to or even more than a mile beneath the earth's surface), they must be able to run for extended periods without requiring maintenance.

Conventional submersible motors are generally not capable of withstanding the high operating temperatures and pressures associated with the DWS environment. Some applications require the pump to operate in surrounding liquid temperatures of over 100° C. or more. For example, in situations involving geothermal wells, the water being extracted from the earth may be up to 160° C. or more.

Further, submersible pump systems often use larger motors which demand greater power. Such motors typically have multiple stators built in series, creating a multi-stage motor in order to reduce the well diameter. A common problem with conventional multi-stage motors is that they have only one cooling circuit to cool all of the stators. However, a single cooling circuit is generally not sufficient to maintain a cool temperature throughout a multi-stage motor. As a result, a heat gradient forms in the axial direction through the multi-stage motor. The temperature rises from one stator to the next, with the highest temperature at the top stator of the multi-stage motor. This can cause an alteration of the motor winding and can lead to early winding failure.

Thus, the effectiveness of the cooling system determines the maximum power that can be obtained from a motor of a particular size, as well as the lifetime of the motor, especially the motor winding. The better the cooling system, the more power can be obtained from the same motor size, and the longer the lifetime that can be expected. Conversely, the motor can be operated at the same power but with a lower inner temperature with an improved cooling system, which would significantly increase the lifetime and robustness of the submersible motor. Therefore, it would be beneficial for the lifetime of the motor to keep the heat gradient low in order to avoid hot-spots and damage to the winding insulation of the motor.

Thus, there exists a need for a cooling system that will maintain an acceptable temperature throughout a multi-stage motor.

SUMMARY

The embodiments of the present invention provide cooling systems for multi-stage motors, particularly those used in submersible pump systems. They can be operated in high temperature environments, if desired. The multi-stage motors include multiple motors, each with its own cooling system so that the heat gradient over the multi-stage motor is kept to a minimum. The stators remain sufficiently cool because each stator transfers the heat it generates to the cooling fluid in its own independent cooling fluid path. As a result, the temperature distribution, as well as the minimum, maximum, and average observed temperatures, in the stators are relatively consistent across the multi-stage motor. This protects the winding from damage and extends the operating life of the motor.

In accordance with one embodiment, the multistage electric motor includes a plurality of motor stages connected in series, each motor stage comprising a stator, and a rotor; a plurality of cooling fluid paths, each cooling fluid path forming a recirculating loop independent of the other cooling fluid paths, each cooling fluid path in communication with the stator of one of motor stages; and cooling fluid flowing through each cooling fluid path, the cooling fluid removing heat from the stator of each motor stage.

In accordance with another embodiment, a submersible pump includes a pump; and a multistage electric motor operatively connected to the pump comprising: a plurality of motor stages connected in series, each motor stage comprising a stator, and a rotor; a plurality of cooling fluid paths, each cooling fluid path forming a recirculating loop independent of the other cooling fluid paths, each cooling fluid path in communication with the stator of one of the motor stages; and cooling fluid flowing through each cooling fluid path, the cooling fluid removing heat from the stator of each motor stage.

Another aspect of the invention is a method of cooling a multistage electric motor including providing a multistage electric motor comprising: a plurality of motor stages connected in series, each motor stage comprising a stator, and a rotor; a plurality of cooling fluid paths, each cooling fluid path forming a recirculating loop independent of the other cooling fluid paths, each cooling fluid path in communication with the stator of one of the motor stages; and cooling fluid flowing through each cooling fluid path; circulating the cooling fluid in the cooling fluid path; and reducing the temperature of the stator of each motor stage independent of any other motor stage, the temperature being reduced by the cooling fluid.

BRIEF DESCRIPTION OF THE DRAWINGS

The following detailed description of specific embodiments can be best understood when read in conjunction with the following drawings, where like structure is indicated with like reference numerals and in which.

Figures 1A, 1B:
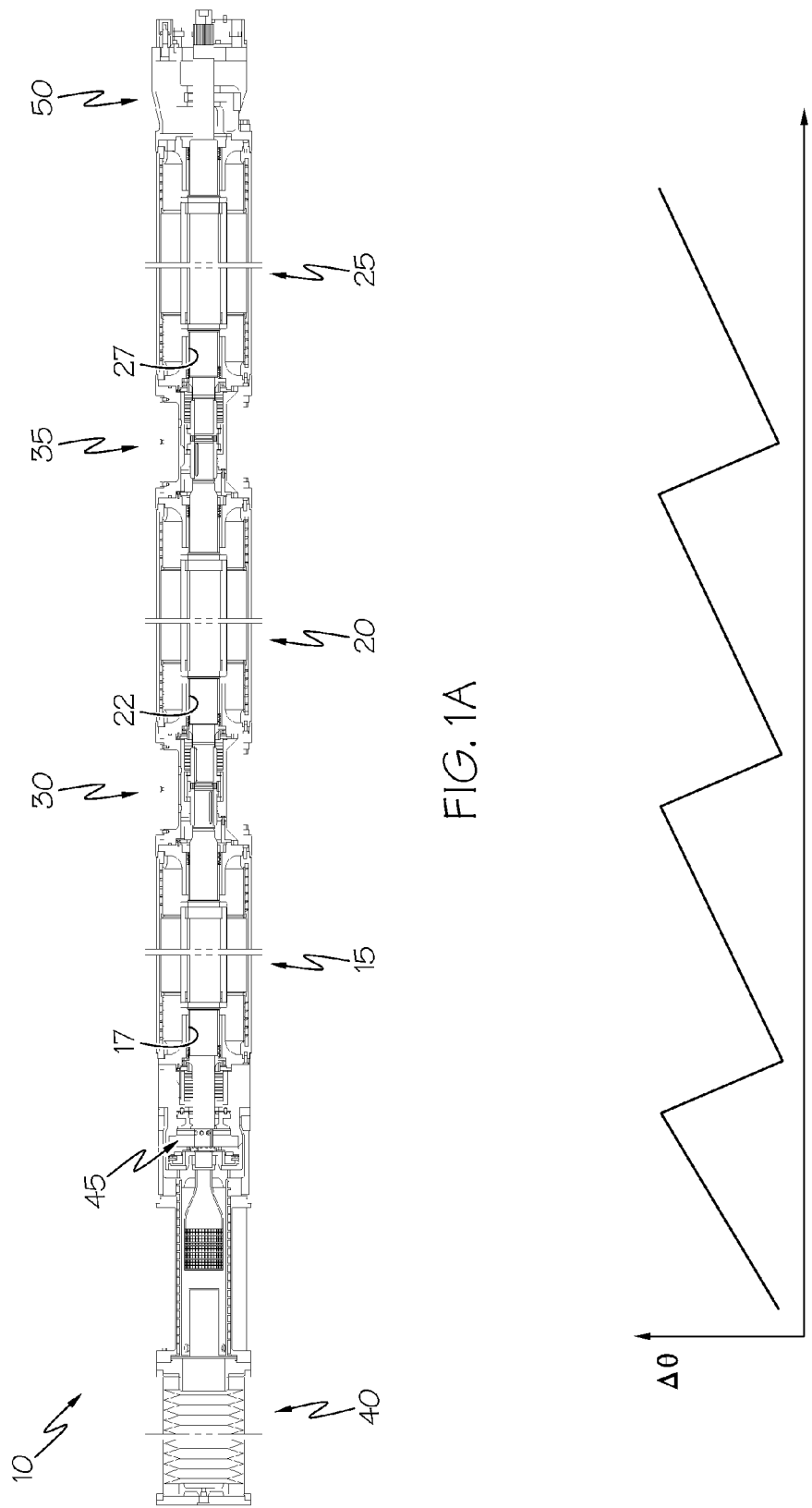
FIG. 1A is an illustration of a multistage electric motor according to one embodiment of the present invention.
FIG. 1B is a graph illustrating the heat buildup in the multistage electric motor of FIG. 1A.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

The multistage electric motor has a plurality of motor stages, each with an independent cooling fluid path. This allows the heat generated in one stator to be dissipated in that stator, preventing excess heat buildup and the resulting damage to the windings and bearings. In addition, the minimum, maximum, and average temperature will be approximately the same in each stator. Furthermore, the temperature distribution for each stage will be approximately the same.

For example, a two stage motor would have an motor fluid intake temperature from about 120° C. which would increase over the length of the stator up to about 130° C. The second stator would also have an intake temperature from about 120° C. which would also rise up to about 130° C. The difference between intake and outlet temperature for both stages would be 10° C.

The previous cooling design of a two stage motor would have only one cooling path over the whole length of the motor. For example, the intake temperature at the first stator would be about 120° C. and would rise over the length of that stator to about 130° C. The intake temperature in the second stator would then be 130° C. and would rise to about 140° C. The difference between intake and outlet would be 20° C. for both stages. This temperature increase would continue if the number of stators increased.

FIG. 1A illustrates one embodiment of a multistage electric motor 10 according to the present invention. It includes three stators 15, 20, and 25 with respective rotors 17, 22 and 27 connected in series. Although three stators are shown in FIG. 1A, there can be as many stators as are needed to provide sufficient power for the particular application, with a minimum of two.

Stator 15 is separated from stator 20 by coupling 30, and stator 20 is separated from stator 25 by coupling 35. The couplings separate the stators so that independent fluid paths can be provided, as described in more detail later. The multistage motor 10 includes a compensator 40, and an axial thrust bearing 45 before the first stator 15. After the third stator, there is a top casing 50 with a double mechanical seal.

FIG. 1B illustrates the change in temperature over the multistage electric motor shown in FIG. 1A. The temperature rises through the thrust bearing 45, then drops at the connection between the thrust bearing 45 and the first stator 15. The temperature rises through the first stator 15, and drops at the coupling 30 between the first stator 15 and the second stator 20. It rises through the second stator 20, and drops when coupling 35 between the second stator 20 and the third stator 25 is reached. The temperature rises again through the third stator 25. The separation of the three stators and the thrust bearing from each other, each with its own independent cooling path, prevents the temperature from increasing too much and damaging the windings.

Figure 2:
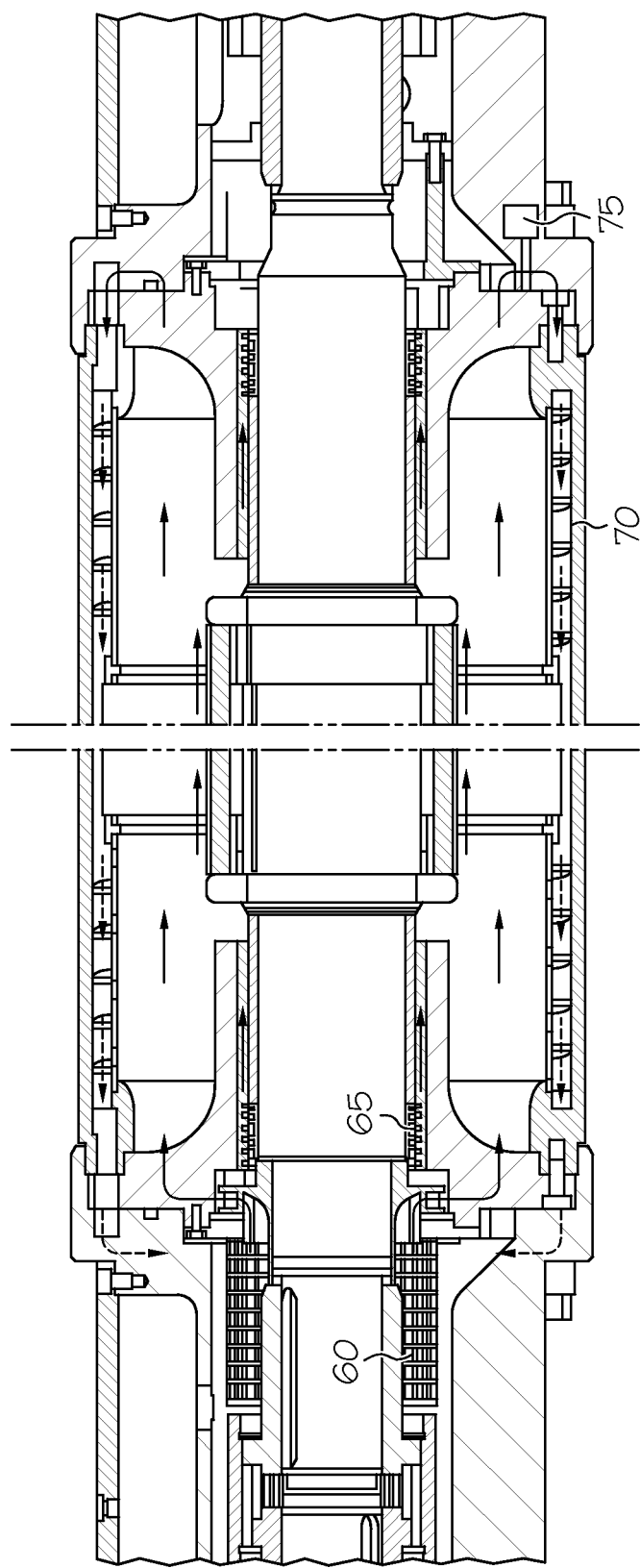
FIG. 2 is an illustration of one embodiment of the cooling scheme for one of the stators.

FIG. 2 illustrates the cooling scheme across each motor stage. The arrows show the cooling fluid path. The cooling fluid path is a continuous loop so that the cooling fluid recirculates through each individual motor stage. The cooling fluid enters the strainer 60, and flows along the inner cooling fluid path 65. The cooling path is a multi-channel path through the motor. The inner cooling fluid path 65 is positioned close to the inside of the stator so that the cooling fluid can remove the heat generated in the stator. As it does so, the temperature of the cooling fluid rises. When the fluid reaches the end of the motor stage, it returns to the beginning of the motor stage through the outer cooling fluid path 70. The outer cooling fluid path 70 is near the outside of the stator. Although this view does not show the openings in the housing, one of skill in the art would understand that such opening exist in order for the fluid flow to proceed as shown and described.

The cooling fluid absorbs the heat generated by the motor as it flows through the inner stator cutout path. The cooling fluid can be cooled by an appropriate cooling system. In many cases, the temperature of the cooling fluid can be reduced adequately by the fluid in the well outside the casing. The return cooling fluid path is located near the outside of the casing, and the fluid flowing in the well outside the casing absorbs heat from the cooling fluid, reducing the temperature of the cooling fluid. However, in some situations, the temperature of the fluid in the well may be too high, and the normal convection of the stator surface may not sufficient to cool the cooling fluid. In that case, additional cooling of the cooling fluid may be necessary. For example, a fluid chiller 75 can be included in communication with the cooling fluid path to reduce the temperature of the cooling fluid. The fluid chiller enlarges the surface area exposed, resulting in increased cooling. Suitable fluid chillers include, but are not limited to, heat exchangers. There can be one or more fluid chiller, if desired. Each motor stage can have its own fluid chiller, if desired. The fluid chillers can be independent of one another, if desired. The fluid chiller can be located in different places in the system. Its location will normally be determined by the needs of the head to be transferred, well size, and operation conditions. The fluid chiller can be on top of the motor as a rising main cooler, as a coil around the bladder housing, if desired.

Figure 3:
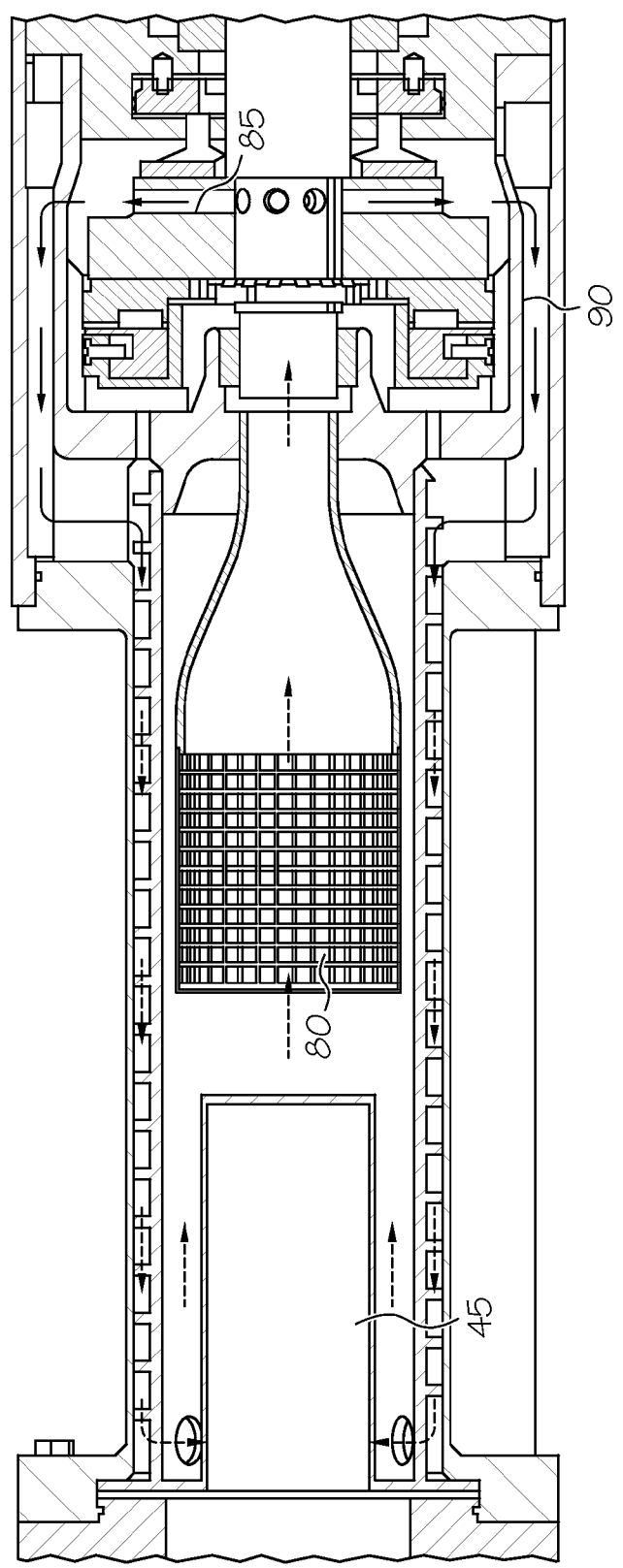
FIG. 3 is an illustration of the cooling scheme of the thrust bearing (bottom stator).

FIG. 3 shows the cooling fluid path for the thrust bearing. The cooling fluid flows through the strainer 80 to the axial thrust bearing 45. When it reaches the pumping disk 85, which works as an impeller, the fluid returns along the fluid path 90.

Figure 4:
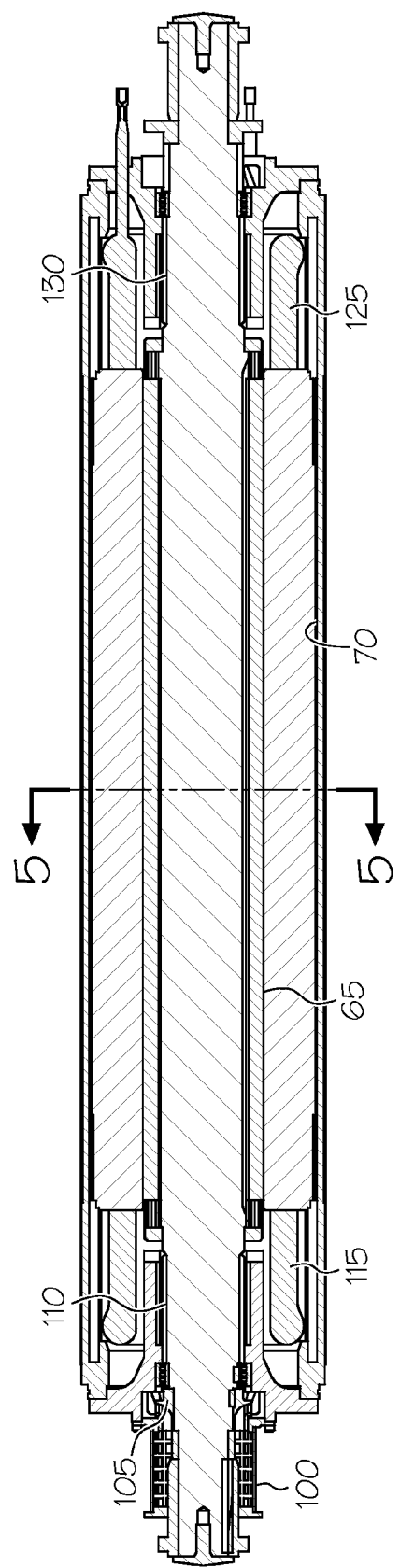
FIG. 4 is an illustration of one embodiment of the stators.

FIG. 4 is another illustration of one of the stators. The cooling fluid enters the strainer 100. There is a pump 105, for example an impeller, to pump the cooling fluid through the cooling fluid path. There are lower radial bearings 110, and winding head 115 at a first end of the stator. The cooling fluid flows along inner cooling fluid path 65 in the stator to winding head 125 and upper radial bearings 130 at a second end of the stator that are generally similar in construction and operation to the respective lower radial bearings 110 and winding head 115 at the stator's first end. The cooling fluid returns along the outer cooling fluid path 70.

Figure 5:
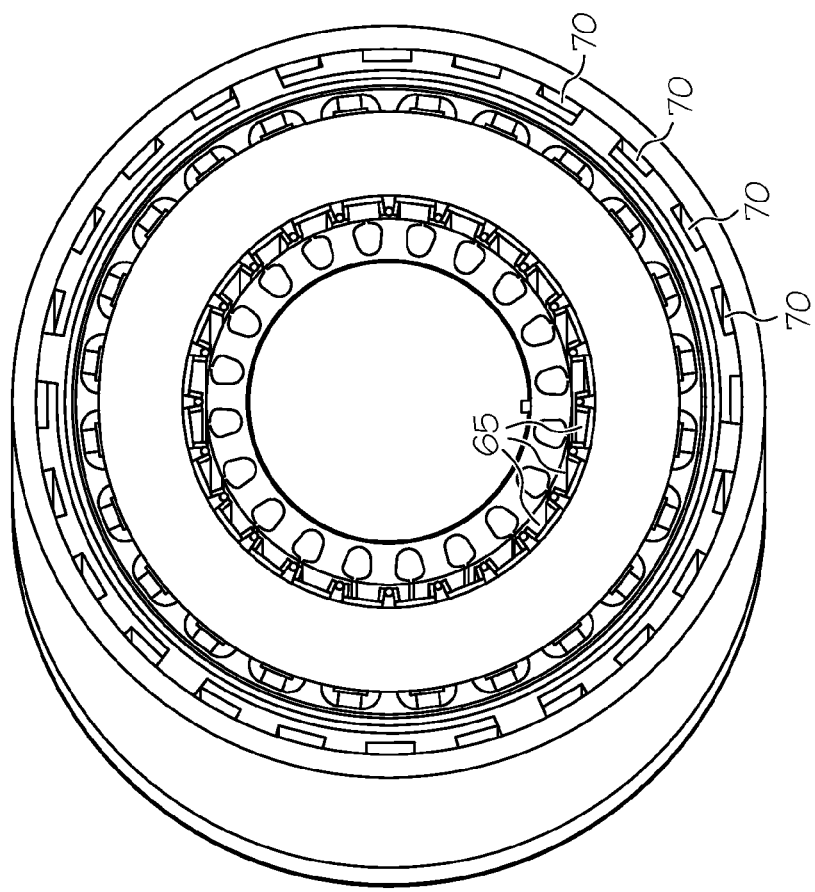
FIG. 5 is a cross-section of the stator along line 5-5 of FIG. 4.

FIG. 5 shows a cross-section of the stator of FIG. 4. The inner cooling fluid path 65 and outer cooling fluid path 70 are channels spaced around the inner and outer circumference of the stator.

The motor bearings and windings can also be surrounded by the cooling fluid. The cooling fluid absorbs the heat from bearings and winding, reducing the temperature of the bearings and windings.

The submersible motors are provided with a pressure compensation system, if desired. A pressure compensation system can be designed into the motor to ensure that the outer pressure of the motor is transferred into the inner motor space. As a result, the differential pressure across the mechanical seal is close to zero in order to minimize leakage and wear of the mechanical seal. Consequently, submersible motors which include a pressure compensation system can be used at any depth.

Figure 6:
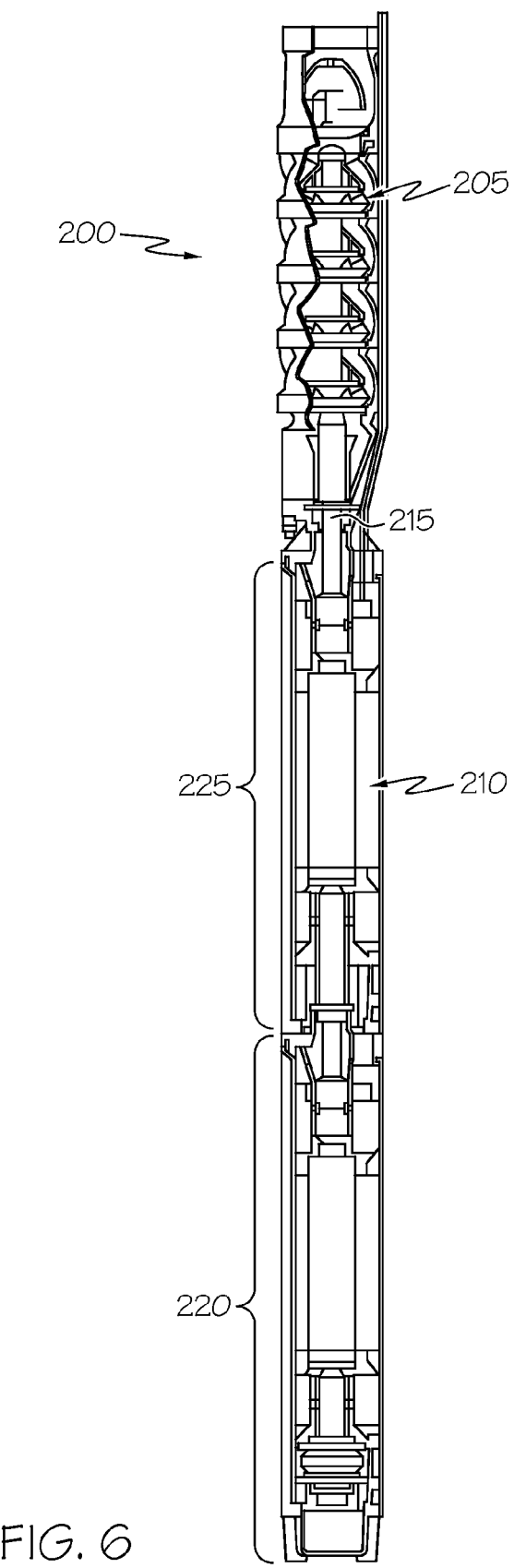
FIG. 6 is an illustration of a submersible pump using a multistage electric motor according to one embodiment of the present invention.

The multistage electric motor can be connected to a pump and used as a submersible pump, as shown in FIG. 6. A submersible pump system 200 generally comprises a submersible pump 205, a submersible multistage electric motor 210, and a drive shaft 215. The submersible pump 205 may be any conventional submersible pump known in the art. The submersible pump 205 generally is any pump operable when submersed in a liquid and operable to propel at least a portion of the liquid into which the pump is submersed upwards to a higher surface.

The multistage electric motor 210 includes two motor stages 220 and 225, as described above. The multistage electric motor 210 generally is any motor operable when submersed in a liquid and operable to drive the submersible pump 205 in propelling the liquid to the higher surface. More particularly, the submersible motor 210 comprises at least one stator that drives rotation of at least one rotor.

The drive shaft 215, which also may be any conventional drive shaft known in the art, connects the multistage electric motor 210 and the submersible pump 205. Rotation of the rotors by the stators in the multistage electric motor 210 rotates the drive shaft 215, which drives the submersible pump 205, resulting in propulsion of the liquid.

Because of its unique cooling system, the multistage electric motor (and the resulting submersible pump) can be used in liquids at temperatures in excess of about 100° C., or in excess of about 120° C., or in excess of about 140° C., or in excess of about 160° C., or between about 100° C. and about 160° C.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A multistage electric motor for a submersible pump, the motor comprising:
 a casing defining a substantially cylindrical containment structure such that a fluid being conveyed by the pump passes along the outside of the casing;
 a plurality of motor stages connected in series within the casing, each motor stage comprising a stator with at least one winding and at least one bearing each of which is susceptible to excessive temperatures generated in the motor and wherein each stator is separated from the stator in the next stage by a coupling which allows connection between the adjacent stators;
 a cooling fluid path forming a continuous recirculating loop within the stator of each stage that is independent of the cooling fluid paths of the other of the plurality of stages, each cooling fluid path comprising an inner channel, further comprising a plurality of channels spaced around the inner circumference of the stator, and an outer channel, further comprising a plurality of channels spaced around the outer circumference of the stator, such that a cooling fluid passes through the inner channel to remove heat from the at least one winding and the at least one bearing and then passes through the outer channel that is adjacent the casing to establish heat exchange communication with the fluid being conveyed in order to reduce temperature differences between each stator within the multistage motor.

2. The multistage electric motor of claim 1 further comprising a fluid pump in fluid communication with the cooling fluid.

3. The multistage electric motor of claim 1 wherein the cooling fluid is a liquid.

4. The multistage electric motor of claim 3 wherein the liquid is selected from water and oil.

5. The multistage electric motor of claim 1 further comprising a pressure compensation system.

6. The multistage electric motor of claim 5 wherein the pressure compensation system comprises a diaphragm.

7. The multistage electric motor of claim 1 further comprising at least one fluid chiller operatively connected to each cooling fluid path of one of the motor stages to reduce the temperature of the cooling fluid.

8. The multistage electric motor of claim 7 wherein the fluid chiller comprises a heat exchanger.

9. A submersible pump comprising: a first pump; and a multistage electric motor operatively connected to the first pump comprising: a casing defining a substantially cylindrical containment structure such that a fluid being conveyed by the first pump passes along the outside of the casing; a plurality of motor stages connected in series within the casing, each motor stage comprising a stator with at least one winding and at least one bearing each of which is susceptible to excessive temperatures generated in the motor and wherein each stator is separated from the stator in the next stage by a coupling which allows connection between the adjacent stators;
 a cooling fluid path forming a continuous recirculating loop within the stator of each stage that is independent of the cooling fluid paths of the other of the plurality of stages, each cooling fluid path comprising an inner channel and an outer channel such that a cooling fluid passes through the inner channel, further comprising a plurality of channels spaced around the inner circumference of the stator, to remove heat from the at least one winding and the at least one bearing and then passes through the outer channel, further comprising a plurality of channels spaced around the outer circumference of the stator, that is adjacent the casing to establish heat exchange communication with the fluid being conveyed in order to reduce temperature differences between each stator within the multistage motor.

10. The submersible pump of claim 9 wherein the multistage electric motor further comprises a cooling fluid pump in fluid communication with the cooling fluid.

11. The submersible pump of claim 9 wherein the multistage electric motor further comprises a pressure compensation system.

12. The submersible pump of claim 9 wherein the multistage electric motor further comprises at least one fluid chiller operatively connected to the cooling fluid path of one of the motor stages to reduce the temperature of the cooling fluid.

* * * * *